Figure 1:
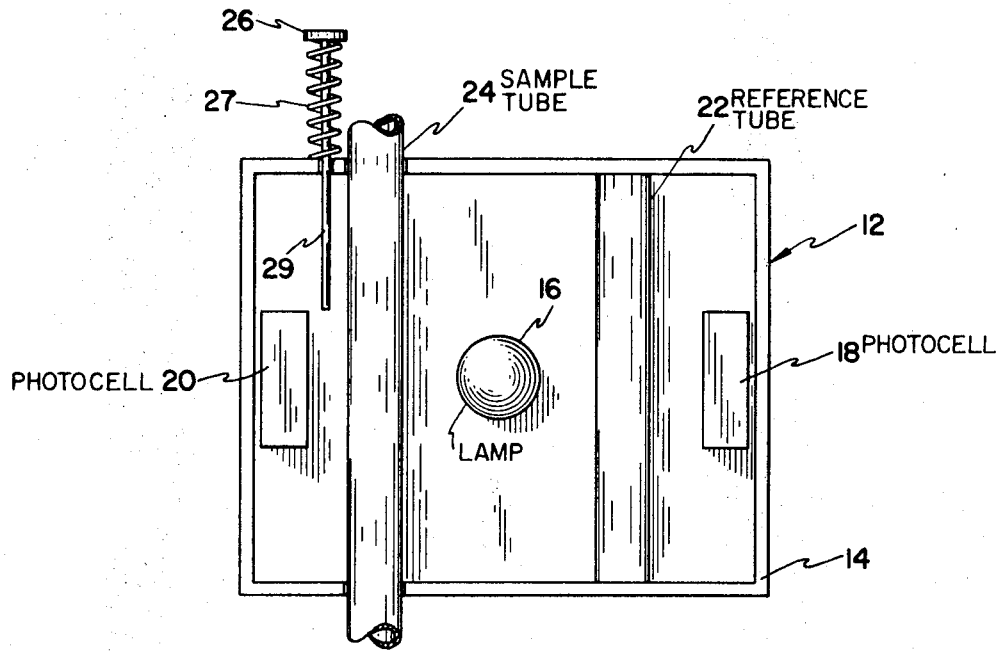

United States Patent

[11] 3,576,558

| [72] | Inventor | Kenneth L. Devries<br>Salt Lake City, Utah |
|---|---|---|
| [21] | Appl. No. | 729,104 |
| [22] | Filed | May 14, 1968 |
| [45] | Patented | Apr. 27, 1971 |
| [73] | Assignee | University of Utah |

[54] OPACITY COMPARISON APPARATUS AND METHOD
4 Claims, 2 Drawing Figs.

[52] U.S. Cl. ................................................. 340/236,
340/237, 250/218, 356/104
[51] Int. Cl. ........................................................ G08b 21/00
[50] Field of Search............................................ 340/237,
237 (S), 236, 228 (S), 222; 350/267; 356/53, 103,
104, 204—208, 218, 222, 226; 250/222, 220, 218,
209; 23/230, 253

[56] References Cited
UNITED STATES PATENTS

| 2,278,920 | 4/1942 | Evans et al. ..................... | 340/237UX |
| 3,202,826 | 8/1965 | Greathouse .................. | 356/208X |
| 2,402,405 | 6/1946 | Hurley, Jr. ..................... | 250/209 |
| 2,656,845 | 10/1953 | Lindsay ......................... | 340/228X |
| 3,226,195 | 12/1965 | Nichols et al. .................. | 250/218X |

*Primary Examiner*—John W. Caldwell
*Assistant Examiner*—Daniel Myer
*Attorney*—Lynn G. Foster ABSTRACT: An apparatus and method for detecting the reduction of light transmitting capability of a fluid being monitored by passing radiation through both the monitored fluid and a reference fluid and comparing the intensity of the radiation emerging from each. When the relative opacity or transparency of the monitored fluid reaches a predetermined level, a signal is generated which is amplified and converted to a detectable warning.

PATENTED APR 27 1971 3,576,558

INVENTOR.
KENNETH L. DE VRIES
BY Lynn G. Foster
ATTORNEY

OPACITY COMPARISON APPARATUS AND METHOD

The present invention relates to an apparatus and method for accurately determining a predetermined critical level of relative opacity incurred by particle contamination of a fluid, the invention being particularly useful in detecting and warning of blood loss through a membrane envelope of an artificial kidney.

The use of an artificial kidney to preserve the life of a patient suffering from renal failure is increasingly becoming the more acceptable treatment. Generally, an artificial kidney comprises a membrane envelope of cellophane or the like through which blood is constantly pumped. The envelope is immersed in dialyzing fluid and only waste products in the blood pass through the membrane into the dialyzing fluid. One serious danger presently inherent in the use of artificial kidneys lies in the possibility that the blood flowing through a defective or damaged membrane envelope may leak into the surrounding dialyzing fluid, which could cause serious blood loss and possibly result in death.

With the foregoing in mind, it is a primary object of the present invention to provide a method and apparatus for detecting the presence of a predetermined number of particles such as blood cells in a fluid which alter the relative opacity or transparency of the fluid.

In summary, when used to detect blood loss into dialyzing fluid of an artificial kidney the present invention provides circuitry which is inactive when radiation passing through dialyzing fluid being monitored is essentially equal to or greater in intensity than the radiation passing through a reference fluid. The radiation preferably eminates from the same source. When blood particles passing into the monitored dialyzing fluid increase the opacity of the monitored fluid a predetermined minimum amount, which may be only a few parts per million (p.p.m.), the intensity of radiation emerging from the monitored fluid will fall below the intensity of radiation emerging from the reference solution sufficient to activate the circuitry and cause an alarm to be energized.

Accordingly, it is therefore another primary object of the present invention to provide a method and apparatus for detecting when a given fluid has reached a critical opacity.

It is another important object of the invention to provide a system, including method and apparatus, for warning of the presence of blood cells in dialyzing fluid.

Figure 2:
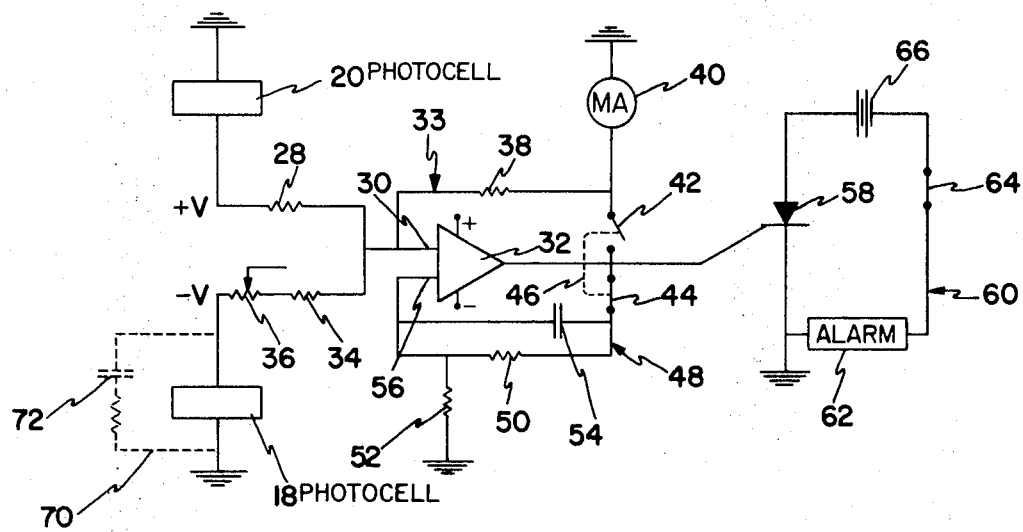

These and other objects and features of the present invention will become more fully apparent from the following description and appended claims taken in conjunction with the accompanying drawings wherein:

FIG. 1 is a diagrammatic representation illustrating the presently preferred embodiment of this invention and particularly showing one arrangement of the detecting components and placement of monitored and reference fluids; and FIG. 2 is a circuit diagram illustrating one presently preferred circuit.

With reference to FIG. 1, a detection chamber, generally designated 12, comprises an enclosure 14 adapted to exclude extraneous light from entering into the detection chamber 12. Central of the enclosure 14 is a source of radiation 16, for example, a conventional electrically-operated lamp. Conventional photodetectors or photocells 18 and 20 are disposed preferably at opposite remote ends of the chamber 12 and are adapted to be equidistance from and in optical alignment with the lamp 16. Interposed between the lamp 16 and the photo cell 18 is a transparent cell or tube 22 which is adapted to contain a standard reference fluid. If desired, air can be used; however it is presently preferred that a standard solution of dialysate be used.

A second transparent tube 24 is situated between the photocell 20 and the lamp 16 and is adapted to contain a volume of dialysate solution flowing continuously from an artificial kidney. The tubes 22 and 24 are spaced essentially the same distance from the source 16. The transparent tube 24 may be connected directly to the artificial kidney so that dialyzing fluid continuously circulated around the membrane envelope will be continuously pumped through the tube 24.

A light-shielding member 29, actuated by a safety-check pushbutton 26, is adapted to be selectively positioned between the tube 24 and the photocell 20 to determine whether the system is functioning properly. A coil spring 27 continuously urges the button 26 upward and the member 29 away from the photodetector 20 to prevent inadvertant obstruction of the photodetector during normal use. The function of member 29 will be discussed hereinafter.

With reference to FIG. 2, the presently preferred embodiment of the electronic circuit is schematically illustrated. The circuitry of FIG. 2 is only one suitable circuitry embodiment and is presented as only illustrative and not to restrict the scope of the invention.

The photocell 20 is connected through a 6,800 ohm resistor 28 to an inverting input 30 of a solid state operational amplifier 32. The amplifier 32 is supplied with power from any balanced 15 volt power supply, such as batteries, so that a balanced charge exists over the amplifier. Although any suitable operational amplifier could be used, it is presently preferred that the SN 52-709 amplifier manufactured by Texas Instruments, Inc. or equivalent be used.

The photocell 18 is connected to the same inverting input 30 as the photocell 20. Interposed between the photocell 18 and the input 30 is a 6,000 ohm resistor 34 and a 1500 ohm potentiometer 36. The purpose for the potentiometer will be described hereafter.

The signal developed by the photocell 20 has a positive sign and a magnitude which is roughly proportional to the intensity of light originating at the lamp 16 and passing through the dialysate solution in the tube 24 (FIG. 1). The photocell 18 develops a negative signal which is roughly proportional in magnitude to the intensity of light passing through the reference solution in the tube 22. While the dialysate solution in tube 24 is maintained free of particles, the potentiometer 36 is adjusted such that the signal reaching the operational amplifier 32 is slightly positive thus indicating that the signal from photocell 20 is dominant. A calibration circuit 33 comprising a 68,000 ohm resistor 38, a conventional milliammeter 40, and a closeable switch 42 is provided to be used to determine when the signal reaching the input 30 is positive in an amount equal to a threshold magnitude. A threshold magnitude is that amount of the positive signal in excess of the magnitude of the negative signal which allows the positive signal to barely dominate when the negative and positive signals are mixed. With the switch 42 closed, the potentiometer 36 is adjusted until the meter 40 reads slightly negative. When the milliammeter 40 reads slightly negative, the dominant signal at the inverting input 30 is the positive signal from the photocell 20. The positive signal is inverted to negative by the inverting input 30 and the magnitude of that signal is detected by the milliammeter 40.

When the calibration circuit 33 has been adjusted to the desired sensitivity with the potentiometer 36, the switch 42 is opened and a switch 44 is simultaneously closed. It is presently preferred that switches 42 and 44 be mechanically or electrically connected as shown at 46 so that when one opens, the other automatically closes and vice versa.

The signal appearing at the inverting input 30 is positive when the light intensity reaching the photocell 20 is sufficient to generate a positive signal having a threshold level greater than the negative signal, the magnitude of which is preset by manipulation of the potentiometer 36. As long as the dialysate solution, being continuously pumped by a source (not shown) from the artificial kidney through the tube 24, is free of blood cells, the signal from the photocell 20 will dominate. However, when the concentration of blood cells in the dialysate solution decreases the light intensity reaching the photocell 20 beyond the threshold magnitude set by the calibration procedure above, the negative signal from the photocell 18 will dominate and a negative signal will appear at the inverting input 30. The signal will then be inverted to positive, amplified by the operational amplifier 32 and conducted through the lower test circuit 48. In each case the sign of the input determines the sign of the output, but the magnitude is large, being near saturation which is one of the advantages of this device.

The circuit 48 provides for positive feedback to the noninverting input 46 and hence causes saturation of either sign depending on the sign of input signal. The circuit 48 is provided with a 68,000 ohm resistor 50 and a 47 ohm resistor 52 connecting the circuit 48 to ground. The resistor 50 causes the signal to appear across the capacitor 54. The capacitor 54 has a value of about 100 picofarads and effectively functions to momentarily delay the signal through the circuit 48. Thus, in the event there is a momentary fluctuation in the signal from the photocell 20, caused by a bubble or the like in the tube 24, the system will be prevented from triggering prematurely.

The momentarily delayed signal then appears at the noninverting input 56 and is again amplified by the operational amplifier 32. The signal thus amplified reaches its strongest positive potential of saturation and that amplified signal is sufficient to operate a silicon controlled rectifier 58 which is responsive exclusively to positive gate signals. Any suitable inexpensive silicon controlled rectifier requiring only several milliamps gate current can be used. The rectifier 58 then energizes the alarm circuit 60.

The alarm circuit 60 comprises a conventional alarm mechanism 62, a switch 64 for selectively deactivating the alarm and an independent power source 66. It is therefore apparent that the presence of blood cells or the like in the dialyzing fluid passing though the transparent tube 24 will cause the signal originating at the phototube 18 to be amplified by the amplifier 32 and trigger the alarm 62 to warn a patient or the like of the presence of blood cells within the dialyzing fluid.

The light-obstructing member 29, shown and described in relation to FIG. 1 may be used to determine whether or not the system is operating satisfactorily. When the button 26 is depressed counter to the bias of the spring 27, the elongated member 29 will be interposed between the light source 16 and the photocell 20. The effect will be the same as if blood cells in the tube 29 had occluded the light from the photocell and the alarm will be activated. This advises the operator that the system is functioning properly.

An auxiliary circuit 70, shown in dashed lines in FIG. 2, may optionally be provided to cause the alarm to be activated in the event the lamp 16 fails. The circuit 70 is provided with a low loss capacitor 72 which becomes charged during the initial operation of the device and, if the lamp fails, will discharge to create a signal pulse which will be amplified and trigger the rectifier 58.

If desired, the relative magnitude of the opacity of the test solution may be measured. For example, the switch 42 may be closed and the switch opened after calibration and during the time that test dialysate solution is conducted through the tube 24. When the test solution becomes sufficiently opaque that the signal from photocell 18 dominates, the signal will be amplified and conducted through the milliammeter 40 or other suitable indicator.

The deflection of the needle on the meter 40 will be proportional to the opacity of the test fluid. Clearly, it would be within the scope of the present invention to put a calibrated meter in series with the meter 40 so that the concentration of particles in the test fluid could be read directly, for example in parts per million.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by U.S. Letters Patent is:

I claim:

1. In a device for detecting a predetermined concentration of relatively opaque particles in a test fluid comprising first means containing a reference fluid and second means containing a test fluid, means continuously displacing the test fluid through the second containing means, means to project radiation simultaneously through the reference fluid and the continuously flowing test fluid in the first and second containing means, respectively, means to continuously monitor the individual intensity of the radiation emerging from each fluid and convert the radiation to an electronic signal, said monitor means comprising spaced photosensitive means comprising one terminal at ground potential and another terminal at a negative potential, and the other photosensitive means comprising one terminal at ground potential and another terminal at a positive potential, the ground potential normally having a value such that the voltage difference between ground and the positive potential is essentially the same as the voltage difference between ground and the negative potential, the positive and negative potentials being supplied to a voltage summation point across resistors, at least one of which is adjustable to normally balance the opposed potentials the electronic signal emanating from the voltage summation point, circuit means responsive to the electronic signal to trigger an alarm circuit only when the intensity of the radiation emerging from the test fluid differs more than a threshold magnitude from the radiation emerging from the reference fluid, and alarm means responsive to the triggered alarm circuit to emit a detectable warning signal.

2. In a device as defined in claim 1 wherein said test fluid comprises a dialysate solution circulated from an artificial kidney.

3. In a device for detecting a predetermined concentration of relatively opaque particles in a test fluid comprising first means containing a reference fluid and second means containing a test fluid, means continuously displacing the test fluid through the second containing means, means to project radiation simultaneously through the reference fluid and the continuously flowing test fluid in the first and second containing means, respectively, means to continuously monitor the individual intensity of the radiation emerging from each fluid and convert the radiation to an electronic signal, circuit means responsive to the electronic signal to trigger an alarm circuit only when the intensity of the radiation emerging from the test fluid differs more than a threshold magnitude from the radiation emerging from the reference fluid, and alarm means responsive to the triggered alarm circuit to emit a detectable warning signal, said circuit means comprise a solid state amplifier provided with (1) a signal inverting input means to receive signals from the detecting means and invert the signals to be amplified, and (1) signal noninverting input means to accommodate reamplification of the first amplified signals without again inverting the signals and time delay means interposed between the amplifier and the noninverting input means to inhibit inadvertent triggering of the alarm circuit.

4. In an apparatus for detecting a critical relative opacity of a fluid comprising:
 a photoelectric cell situated to operatively detect radiation passing through a reference fluid of predetermined opacity such that a reference input signal having a predetermined polarity is developed;
 a photoelectric cell situated to operatively detect radiation passing through a volume of moving test fluid to generate a test input signal normally having a polarity opposite the reference input signal and a magnitude slightly greater than the reference input signal;
 circuit elements to combine the reference and test signals so that a single signal having the polarity of the test signal normally results;
 an amplifier adapted to amplify the resulting signal silicon controlled rectifier means receiving the resulting signal and issuing an output signal only after a turn on threshold voltage is received; and
 an alarm circuit electrically connected with the silicon controlled rectifier means and responsive exclusively to the output signal from the silicon controlled rectifier means to generate a detectable alarm only when the opacity of the test fluid is sufficiently greater than the opacity of the reference fluid that the reference signal dominates.